Aug. 24, 1965 J. A. COX 3,201,854

METHOD OF MAKING A SHIELDED TRANSFORMER

Original Filed Jan. 3, 1961 2 Sheets-Sheet 1

INVENTOR.
Jay A. Cox
BY
Wallenstein, Spangenberg & Hattis
Attorneys

METHOD OF MAKING A SHIELDED TRANSFORMER

Original Filed Jan. 3. 1961

INVENTOR.
Jay A. Cox
BY
Wallenstein, Spangenberg & Hattis
attorneys

United States Patent Office 3,201,854
Patented Aug. 24, 1965

3,201,854
METHOD OF MAKING A SHIELDED TRANSFORMER

Jay A. Cox, Rolling Hills Estates, Calif., assignor to Gulton Industries, Inc., Metuchen, N.J., a corporation of New Jersey Original application Jan. 3, 1961, Ser. No. 80,467, now Patent No. 3,149,296, dated Sept. 15, 1964. Divided and this application Sept. 7, 1962, Ser. No. 221,965
1 Claim. (Cl. 29—155.57)

This application is a division of application Serial No. 80,467, filed January 3, 1961, and now Patent 3,149, 296.

The present invention relates to a method of making a shielded transformer which has particular utility in direct curent amplifiers which are notably sensitive to pickup of unwanted signals which cause non-linearities or instabilities in the amplifiers.

One common form of direct current amplifier includes a chopper circuit which converts a direct current (D.C.) input signal to an alternating current (A.C.) signal having an amplitude proportional to the amplitude of the D.C. input signal. The chopper circuit may include an inverter comprising two pairs of electronic switches, for example, in the form of transistors or the like having control electrodes for rendering the devices conductive or non-conductive depending upon the polarity and phase of control signals fed thereto. The two pairs of devices are rendered alternately conductive and are connected to an output transformer in a manner where the D.C. input signal is alternately fed in opposite directions through the input or primary winding of the output transformer. The output transformer connects with the input of an A.C. amplifier circuit whose output is coupled to a demodulator synchronized with the switching rate of the chopper circuit. The demodulator and an associated filter network convert the A.C. amplified signal to a filtered D.C. signal.

The source of control signals for the electronic switches of the chopper circuit and the demodulator is preferably a square wave generator providing a number of separate output signals having a 180° phase relationship. Signals having such a phase relationship are most advantageously obtained from the output windings of a transformer. The input and output windings of the transformer are wound in superimposed relation on a core of magnetic material. Unwanted signals coupled by induction between the square wave generator and the chopper circuit or demodulator are readily eliminated by enclosing the latter transformer and, if necessary, other parts of the square wave generator, in a separate housing constituting a magnetic shield. Unfortunately, however, prior to the present invention it was difficult to eliminate or substantially reduce unwanted signals capacitively coupled between the superimposed input and output windings of the latter transformer which signals created unbalanced current components in the output of the chopper circuit and the demodulator which resulted in substantial nonlinearity or instability in the D.C. amplifier.

An object of the present invention is to provide an economical method of making shielded transformers, most especially (but not necessarily) toroidal transformers, which substantially eliminates said unwanted signals capacitively coupled between the input and output windings of the transformer.

The transformer construction to which the present invention has the greatest utility has a conductive shield between the input and output windings wound around a core, the shield having a longitudinal insulating gap which prevents the formation of a short circuit loop. In accordance with the present invention, the conductive shield is formed by coating as by spraying all exposed surfaces of the innermost windings, except for a longitudinal insulating gap, with a conductive material, such as a low melting conductive material like zinc. The insulating gap is formed by applying a strip of masking tape around the outside perimeter of the partially wound core for the full 360° thereof before the spraying or other coating applying operation. After the coating operation, the masking tape is removed leaving an annular insulating gap. The coating of zinc or other conductive material is, of course, insulated from the main body of the windings to be shielded as by the insulation surrounding the wire forming the windings.

The sensitivity of many D.C. amplifiers is such that the aforesaid insulating gap is, in many cases, of sufficient size to allow passage therethrough of a significant interfering electric field which would adversely effect the operation of the amplifier. The present invention overcomes this difficulty by separately shielding the insulating gap in a way which avoids the formation of a conductive bridge across the spaced longitudinal margins of the conductive coating bordering the insulating gap. This is most advantageously accomplished by first applying a strip of insulating material over the insulating gap, the insulating material being sufficiently wide to extend beyond the margins of the gap. A narrower strip of conductive material is positioned within the margins of the strip of insulating material so as to shield or cover the insulating gap. Both the coating of conductive material and the strip of conductive material covering the insulating gap are electrically connected to ground or other common reference voltage point as by means of a single bare ended conductor soldered between the strip of conductive material and only one of the longitudinal marginal portions of the conductive coating bordering the insulating gap. The strip of conductive material is thus isolated from direct electrical contact with the other longitudinal marginal portion of the conductive coating bordering the insulating gap, to prevent the formation of a conductive loop. The winding or windings which are to be shielded from the inner winding or windings of the transformer unit are then wound over the shielding structure just described.

Other objects, advantages and features of the invention will become apparent upon making reference to the specification to follow, the claim and the drawings wherein:

Figure 1:
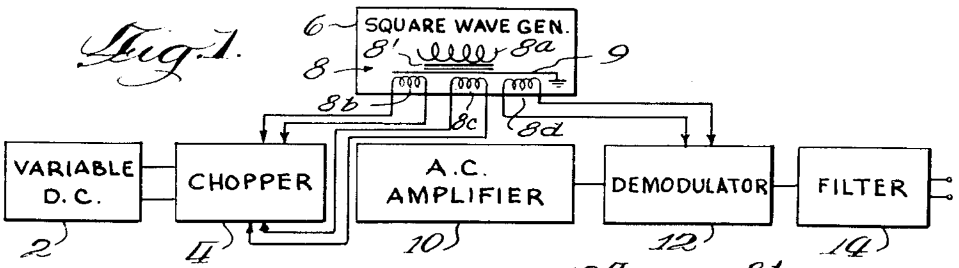
FIG. 1 is a simplified box diagram of a D.C. amplifier in which the present invention has particular utility.

Referring now to the box diagram of FIG. 1, a typical D.C. amplifier includes a source of variable D.C. signal voltage to be amplified which is coupled to the input of a chopper circuit 4. The chopper circuit converts the D.C. signal voltage into an A.C. voltage having an amplitude corresponding or proportional to the amplitude of the D.C. signal voltage input. As will appear, the chopper circuit includes a series of switching devices which are rendered alternately conductive under control of a source of signal voltage fed from a square wave generator 6. The square wave generator has an output transformer 8 with at least one primary or input winding 8*a* and a series of secondary or output windings 8*b*, 8*c* and 8*d* wound on a saturable core 8'. The connections made between the output windings 8*b* and 8*c* and the chopper circuit are such that the voltages are applied to the chopper circuit from these windings 180° out of phase. The customary chopper circuit used in D.C. amplifier circuits requires that these connections all be ungrounded, that is "floating" with respect to ground. In this environment, the problem of capacitive coupling of signals from the input winding 8*a* to the chopper circuit via the output windings 8*b* and 8*c* becomes so significant that they can very seriously adversely affect the operation of the D.C. amplifier system. The invention provides a unique electrostatic shielding construction 9 diagrammatically illustrated in FIG. 1 which minimizes or eliminates this capacitive coupling.

The A.C. output of the chopper circuit 4 is fed to a D.C. ampifier 10 and then to a demodulator circuit 12 which converts the A.C. voltage to a pulsating direct current voltage. In the manner to be described, the demodulator is operated in synchronism with the chopper circuit by means of "floating" connections from the output winding 8*d* of the transformer 8 to the demodulator circuit. The pulsating D.C. signal is then filtered by a suitable filter circuit 14 to provide the resulting amplified D.C. signal.

Figures 2, 3, 4:
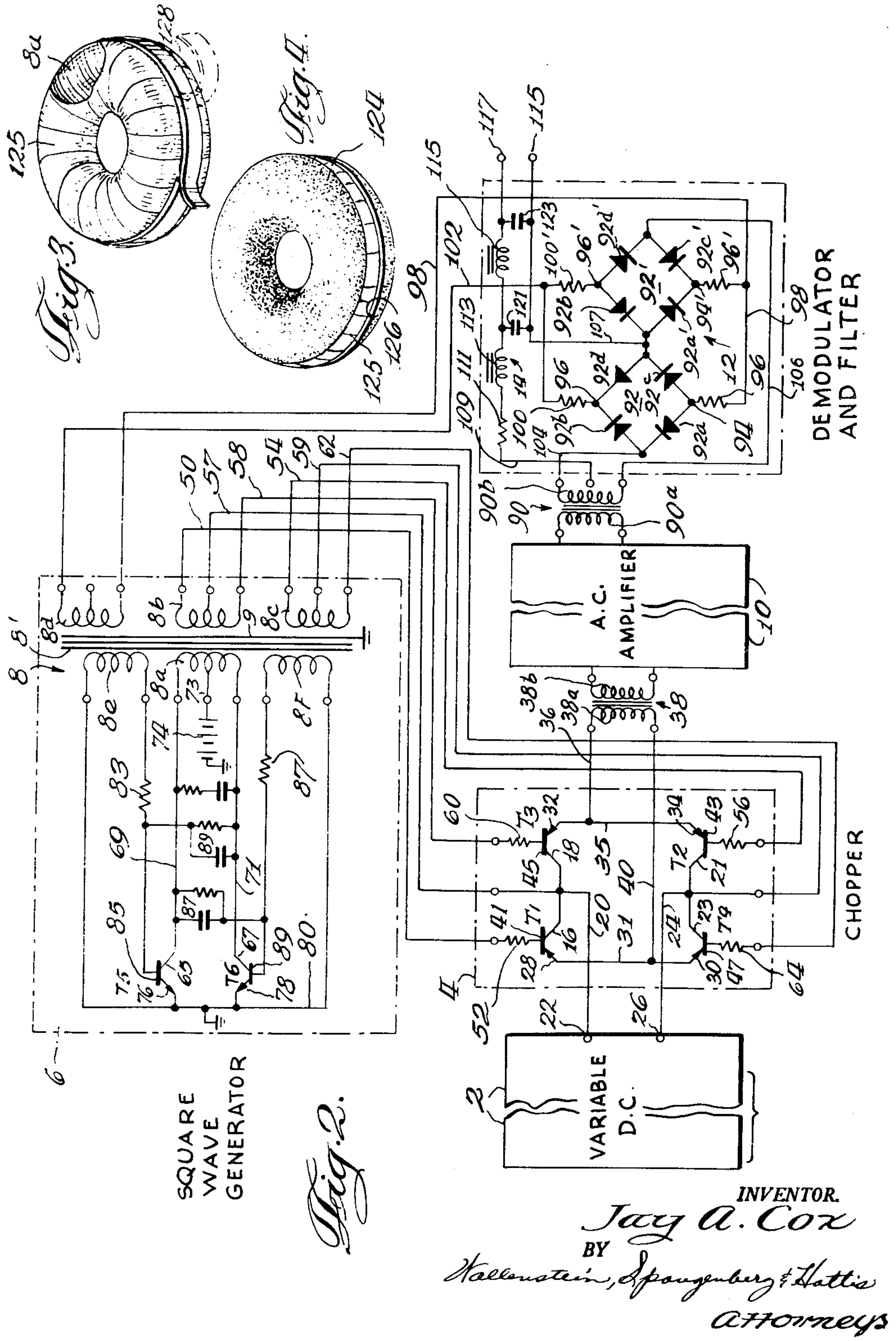
FIG. 2 is a circuit diagram of a part of the D.C. amplifier shown in FIG. 1.
FIGS. 3 and 4 are perspective views showing successive stages in the process of fabricating the shielded transformer forming part of the D.C. amplifier of FIGS. 1 and 2.

The specific nature of the D.C. amplifier system can, of course, be varied widely and the components thereof just described can be any one of a number of well known types. For purposes of illustration only, exemplary circuit details for the chopper, square wave generator, demodulator and filter circuits shown in FIG. 1 are illustrated in FIG. 2.

The chopper circuit as illustrated includes a first pair of PNP transistors T1 and T2 and a second pair of PNP transistors, T3 and T4. The collector electrodes 16 and 18 of the transistors T1 and T3 are connected by a conductor 20 to the negative terminal 22 of the source of variable D.C. signal voltage 2. The collector electrodes 21 and 23 of the transistors T2 and T4 are connected through a conductor 24 to the positive terminal 26 of the variable D.C. signal source. The emitter electrodes 28 and 30 of transistors T1 and T4 are connected together by a conductor 31 and the emitter electrodes 32 and 34 of the transistors T3 and T2 are connected together by a conductor 35. The latter conductor 35 is connected by a conductor 36 to one end of the input winding 38*a* of an output transformer 38. The conductor 31 connecting the emitter electrodes 28 and 30 of the transistors T1 and T4 are connected through a conductor 40 to the other end of the input winding 38*a*.

As will appear, when the first pair of transistors T1 and T2 are rendered conductive, the path for current flow through the chopper circuit from the negative terminal 22 of the variable D.C. signal source 2 can be traced through the conductor 20, collector and emitter electrodes 16 and 28 of the transistor T1, conductors 31 and 40, the input winding 38*a* in a direction from the bottom to the top terminals thereof, conductor 35, the emitter and collector electrodes 34 and 21 of transistor T2, and conductor 24 leading to the positive terminal 26 of the variable D.C. signal source. When the second pair of transistors T3 and T4 are conductive, current flow can be traced in a path extending from the negative terminal 22 through the collector and emitter electrodes 18 and 32 of transistor T3, conductor 36 leading to the upper end of the input winding 38*a*, conductor 40, emitter and collector electrodes 30 and 23 of transistor T4 and the conductor 24 leading to the positive terminal 26.

As previously indicated, the means for opening and closing the electronic switches formed by the transistor devices T1–T2 and T3–T4 includes control signals from the square wave generator 6. The transistors are rendered conductive and non-conluctive by the feeding of suitably phased voltage to the base electrodes 41 and 43 of transistors T1 and T2 and base electrodes 45 and 47 of transistors T3 and T4. The upper terminal of output winding 8*b* of the square wave generator transformer 8 is coupled by a conductor 50 to a resistor 52 connected to the base electrode 41 of transistor T1. The upper terminal of the output winding 8*c* is coupled by conductor 54 to a resistor 56 connected to the base electrode 43 of transistor T2. The windings 8*b* and 8*c* have center tapped points respectively connected by conductors 57 and 59 to the commonly connected collector electrodes of transistor pairs T1–T3 and T4–T2. It is thus apparent that the phase of the induced voltage at the upper terminals of output windings 8*b* and 8*c* is identical and that the transistors T1 and T2 are simultaneously rendered conductive and non-conductive during successive half cycles of the square wave output of the transformer 8.

The bottom terminal of output winding 8*b* is coupled by a conductor 58 to a resistor 60 connected to the base electrode 45 of transistor T3. The bottom terminal of the output winding 8*c* is coupled by a conductor 62 to a resistor 64 connected to the base electrode 47 of transistor T4. It is likewise apparent that transistors T3 and T4 will be rendered simultaneously conductive and non-conductive alternately with the first-mentioned pair of transistors T1 and T2.

The square wave generator 6 illustrated in the drawings includes a pair of NPN transistors T5 and T6. These transistors have collector electrodes 65 and 67 connected through conductors 69 and 71 to opposite ends of the transformer input winding 8*a*. The input winding has a center tap point 73 connected to the positive terminal of a source of direct current voltage 74, the negative terminal of which is grounded. The transistors T5 and T6 have emitter electrodes 76 and 78 respectively connected to a ground conductor 80. The ground conductor extends to the upper terminal of a feedback or control winding 8*e* wound on the core 8' of the transformer unit 8. The bottom terminal of the winding 8*e* is connected through a resistor 83 of the base electrode 85 of the transistor T5. The ground conductor 80 also extends to the bottom terminal of a second feedback or control winding 8*f* whose upper terminal is connected through a resistor 87 to the base electrode 89 of the transistor T6. A capacitor-resistor network 87 is connected between the collector electrode 65 of transistor T5 and the base electrode 89 of the transistor T6. A similar capacitor-resistor network 89 is connected between the collector electrode 67 of the transistor T6 and the base electrode 85 of the transistor T5. These feedback networks aid in reducing the change-over time when the conductive condition of the transistors T5 and T6 reverse. When one of the transistors T5 initially becomes conductive, the resulting flow of current through the input winding 8*a* generates a feedback voltage in the feedback winding 8*e* which maintains the conduction of the transistor T5. Conversely, the voltage induced in the other feedback winding 8*f* at that instant is in a direction which keeps the transistor T6 non-conductive. The core 8' of the transformer unit 8 is made of a rectangular hysteresis material and when this material saturates, the sense of the voltages then induced in the feedback windings 8*e* and 8*f* reverses to trigger the then non-conductive transistor into a conductive state and the conductive transistor into a non-conductive state. It can be shown that the output voltage induced in the output windings 8*b*, 8*c* and 8*d* is substantially a square wave as illustrated in FIG. 2.

As previously indicated, the chopper circuit 4 provides a flow of alternating current in the input winding 38*a* of the output transformer 38 whose amplitude is proportional to the amplitude of the input D.C. signal voltage fed from the source 2. Transformer 38 has an output winding 38*b* feeding the input of an A.C. amplifier 10 which may be a conventional type amplifier. The amplifier 10 has an output transformer 90 with an input winding 90a and an output winding 90b which feeds the input of the demodulator circuit 12.

The demodulator circuit includes a pair of rectifier bridge networks 92 and 92'. The bridge network 92 includes a first pair of rectifiers 92a and 92b connected in series in the same sense between a pair of opposite bridge terminals 94–96. It also has a second pair of rectifiers 92c and 92d which are connected in series in the same manner between the terminals 94 and 96.

The other bridge network 92' comprises a pair of rectifiers 92a' and 92b' connected between terminals 94' and 96' but arranged in the opposite sense to the corresponding rectifiers 92a and 92b in the other bridge network 92 so that the path for current flow is between terminals 94' and 96' instead of between 96' and 94'. The second bridge network includes a second pair of rectifiers 92c' and 92d' which are connected in series in the same sense as rectifiers 92a' and 92b' between the terminals 94' and 96'.

The bridge network terminals 94 and 94' are connected through respective resistors 96 and 96' to a common conductor 98 extending to the bottom terminal of the output winding 8d of the square wave generator transformer 8. The bridge network terminals 96 and 96' are connected through respective resistors 100 and 100' to a common conductor 102 extending to the upper terminal of the transformer output winding 8d.

The upper terminal of the amplifier output transformer winding 90b is connected by a conductor 104 to the juncture between rectifiers 92a and 92b of bridge network 92 and the bottom terminal of the latter winding is connected by a conductor 106 to the juncture between the rectifiers 92c' and 92d' of the bridge network 92'.

The juncture between the other pairs of diodes 92c–92d and 92c'–92d' of the two bridge networks are connected to a common conductor 107 extending to one of the inputs of the filter network 14. The amplifier output transformer winding 90b has a center tap point which is connected by a conductor 109 to the other input of the filter network 14. The input conductor 109 extends to a series circuit of a resistor 111, a filter choke 113 and a filter choke 115 leading to an output terminal 117 of the filter network. The other input conductor 107 to the filter network extends to the other output terminal 119 of the filter network. Filter capacitors 121 and 123 are connected between the opposite sides of the filter choke 115 and the input conductor 107.

It is apparent that the frequency of the signal in the amplifier output transformer winding 90b and the control signal fed to the demodulator circuit from the square wave generator transformer winding 8d is identical, the amplitude of the former signal varying with the amplitude of the variable input D.C. signal and the output of the latter signal being constant. The polarity of the alternating current signals fed from these two sources to the demodulator circuit also change at the same instant of time. It can be shown that the demodulator circuit just described is so designed that the alternating current output from the transformer 90 is converted to a constant D.C. signal at the output of the filter network 14 having an amplitude proportional to that of the variable D.C. input signal delivered by the signal source 2.

It can be appreciated that the useful signals coupled between the primary winding 8a of the square wave generator transformer 8 and the output windings 8b, 8c and 8d are inductively rather than capacitively coupled. Unwanted signals inductively coupled to the chopper circuit and demodulator circuit can be avoided by enclosing the square wave generator in a separate housing made of magnetic shielding material. Any signals which are capacitively coupled between the input and the output windings of the transformer would also adversely affect the D.C. amplifier by creating unbalanced current components in the system which would result in instabilities or non-linearities in the characteristics of the D.C. amplifier system.

Refer now to FIGS. 3 through 8 which show the construction of the square wave generator transformer 8. The transformer has a toroidal core 8' made of a rectangular hysteresis core material. The input winding 8a may comprise a wire 8a' having a suitable covering or coating of insulation 8a'' as in the case of conventional insulated wire used in the fabrication of transformer windings. The insulated wire 8a' is wound around the core 8' in a conventional way and may constitute one or more layers of wire turns extending part way around or completely around the toroidal core. The feedback windings 8e and 8f may, if desired, occupy a position around or beneath the turns constituting the input windings 8a or they may be wound around different segments of the toroidal core 8' not occupied by the input winding 8a, where the latter does not extend a full 360°. These details, of course, have nothing whatever to do with the present invention.

The shielding 9 between the input and output windings of the transformer includes a coating 124 of electrically conductive material applied over the innermost of these windings, the input winding 8a in the exemplary form of the invention being described (and the other windings 8e and 8f where they constitute inner windings of the core along with windings 8a). The conductive coating, most advantageously, is zinc sprayed in molten form over the entire exposed surface area of the core unit before the output windings 8b, 8c and 8d are applied, except for a peripheral annular insulation gap 126 extending all the way around the core unit. The insulation gap 126 prevents the formation of a short circuit loop which would adversely effect the operation of the transformer. The installation gap 126 is most advantageously formed in the manner illustrated in FIG. 3. Before the molten zinc coating is sprayed on the core unit, a strip 128 of masking tape is secured around the outside of the partially wound core unit. Also, prior to the application of the molten zinc, a winding 125 of Mylar or similar insulation is wound around the partially wound core unit to protect the insulating coating 8a'', etc. of the subjacent winding or windings from the hot zinc which could destroy the coating. The winding 125 can be omitted where the insulation 8a'' is not adversely affected by the application of the coating 124. Then the entire exposed surface of the core unit is sprayed with zinc and the masking tape 128 is then stripped from the core to leave the continuous insulating gap 126. In one embodiment of the invention, the insulating gap had a width of 1/16 of an inch. However, the exact width of the insulating gap is unimportant. Zinc is the preferable material for the conductive coating 124 since it has high conductivity and a low melting temperature which will not harm or destroy the masking tape 128 or other insulation materials beneath the coating.

Despite the fact that the insulating gap 126 occupies only a small fraction of the area covered by the conductive coating 124, it has been found that for D.C. amplifier applications the insulating gap 126 described above provides a sufficient space that capacitive coupling to the output windings 8b, 8c and 8d is significant, particularly in situations requiring severe operating requirements for the D.C. amplifier. To prevent such undesired capacitive coupling, the insulating gap 126 is covered by conductive material in a manner which does not bridge the longitudinal marginal portions of the conductive coating 124 bordering the insulating gap. This is accomplished by first applying around the entire core a strip 130 of insulation material of substantially greater width than the insulating gap 126 so that the longitudinal margins thereof extend well beyond the gap, as shown most clearly in FIGS. 6 and 7. The strip of insulating material may be made of Myler insulation having an adhesive coating on the inner side for adhering the same to the conductive coating 124.

A strip of conductive material 136 of tin foil or the like is adhesively or otherwise applied over the strip of insulating material 130 for the full 360° of the toroidal core unit. The conductive strip 136 is somewhat wider than the insulating gap 126 so as to extend beyond the longitudinal margins thereof, but is narrower than the strip of insulating material 130 so that it is located completely within the longitudinal margins thereof.

Figures 5, 6, 7, 8:
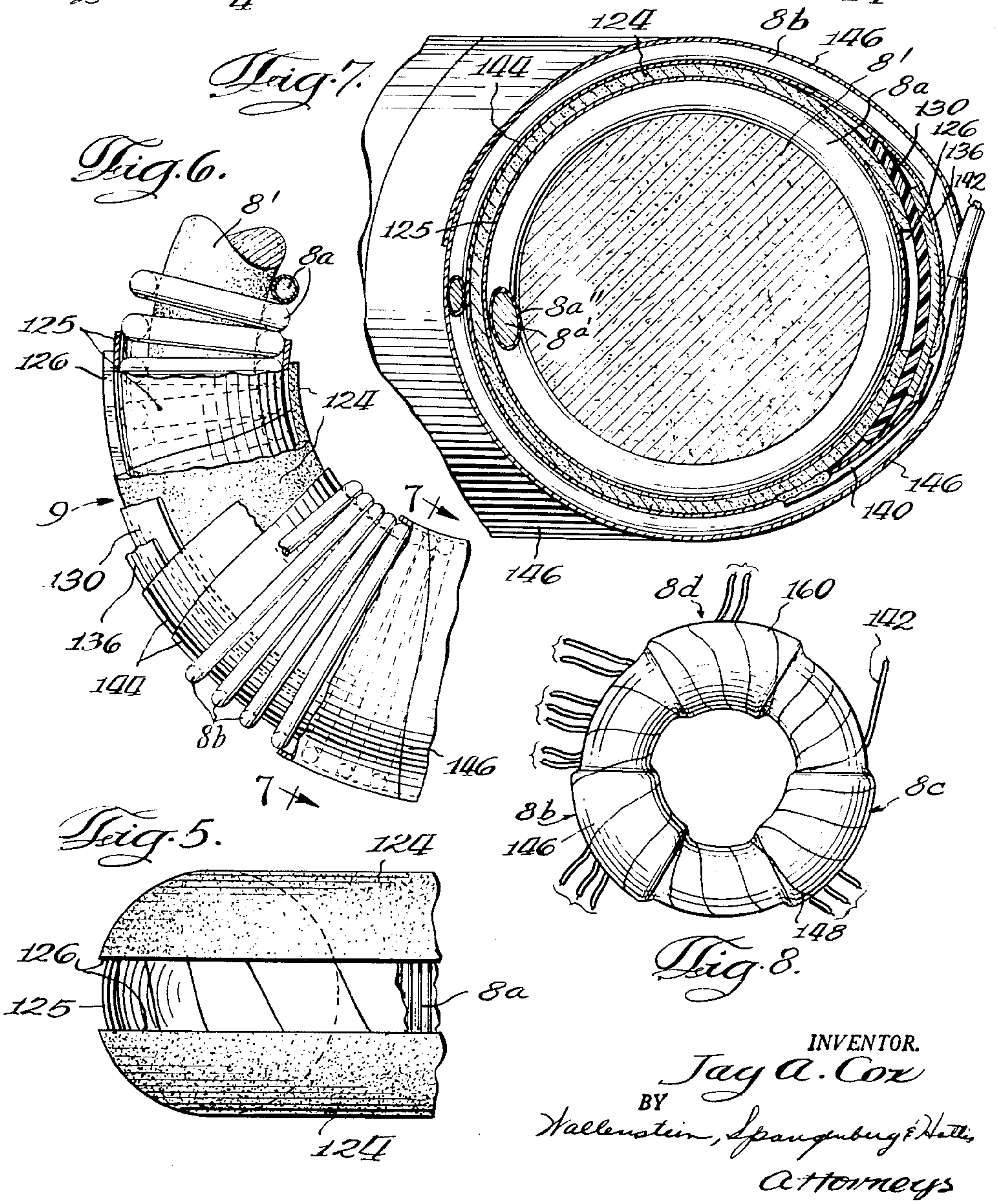
FIG. 5 is an enlarged fragmentary view of the partially made transformer of FIG. 4.
FIG. 6 is a fragmentary broken away view of a completed transformer constructed in accordance with the present invention.
FIG. 7 is a transverse section through the transformer of FIG. 6, taken substantially along the section line 7—7 therein.
FIG. 8 is a plan view of a completed transformer constructed in accordance with the present invention.

The conductive strip 136 is electrically connected to the conductive coating 124 by means preferably including the bared wire end portion 140 of an insulated conductor 142. The bared wire end portion 140 extends circumferentially around the outer portion of the core unit as shown in FIG. 7 and is soldered or otherwise electrically and physically anchored between the conductive strip 130 and the conductive coating 124. The bared wire end portion 140 is thus secured to only one of the longitudinal marginal portions of the conductive coating bordering the insulating gap 126, so that the bared wire end portion and the conductive strip are isolated from direct electric contact from the other longitudinal marginal portion of the conductive coating 124 bordering the insulating gap 126, to avoid providing a short circuit loop.

A layer 144 of insulation in the form of a strip of Mylar material spirally wound around the core unit may then be applied around the core unit to insulate the conductive strip 136 and more importantly, to protect the windings to be tightly applied around the exposed portions of the zinc coating 124 from damage by their contact with the rough surface of the zinc coating. This insulating layer 144 could be omitted where the insulation of the windings to be applied over the shielding construction just described is not damaged by the zinc coating and is otherwise suitable as insulation.

Next, the output windings **8*b*, 8*c* and 8*d* are wound around the shielding construction just described in different angular positions around the core as shown in FIG. 8. Individual Mylar strips 146, 148 and 150 of insulation are then wound around the individual windings 8*b*, 8*c* and 8*d***. The various leads extending to the windings of the transformer unit are shown loosely extending from the transformer. However, these windings can be gathered together at any suitable point or in a number of different points in a manner well known in the art. It should be further understood that additional winding layers or shielding layers may be applied around or between the windings illustrated in the drawings without deviating from the basic aspects of the invention.

The shielding construction above described can be quickly and easily applied so that the transformers can be mass produced. The spraying of the zinc coating 124 is of particular value in this regard, although the broader aspects of the invention envision the application of the coating 124 by other means.

Various additional modifications may be made in the transformer described above without deviating from the broader aspects of the invention.

What I claim as new and desire to protect by Letters Patent of the United States is:

In a process of making a transformer comprising a core of magnetic material with superimposed input and output windings wound on the core, the steps comprising: winding insulated wire around the core to form one of said windings, applying masking tape longitudinally on the core and over said winding, spraying the entire wound core with a conductive material which covers the latter winding and said masking tape, removing said masking tape to leave an insulating gap extending around the core perimeter, which gap prevents the formation of a short circuit loop by the coating of conductive material, applying over the insulating gap a strip of insulating material wider than said insulating gap so that the longitudinal margins thereof extend beyond the margins of the gap on the outside of the coating, applying a strip of conductive material over the strip of insulating material which strip is narrower than the strip of insulating material so that the margins thereof terminate within the margins of the strip of insulating material to provide an electrical shield over said gap, and electrically connecting the strip of conductive material with only one of the longitudinal marginal portions of said coating bordering said insulating gap to prevent the formation of a short circuit loop by placing a circumferentially extending bare ended insulated conductor on only one of the contiguous portions of said strip of conductive material and said coating and soldering the bare end of said conductor to said contiguous portions, and winding insulated wire around the outside of said coated winding on the core to form the other winding of the transformer leaving said insulated conductor projecting from the transformer.

References Cited by the Examiner

UNITED STATES PATENTS

| | | | |
|---|---|---|---|
| 3,032,729 | 5/62 | Fluegel | 336—84 |
| 3,063,135 | 11/62 | Clark | 336—84 X |

FOREIGN PATENTS

| | | |
|---|---|---|
| 901,838 | 11/44 | France. |

WHITMORE A. WILTZ, *Primary Examiner.*